(12) United States Patent
Stephenson et al.

(10) Patent No.: US 10,536,854 B2
(45) Date of Patent: Jan. 14, 2020

(54) CONCATENATED AUTHENTICATION AND AUTHORIZATION TO MULTIPLE NETWORKS

(71) Applicant: Ruckus Wireless, Inc., Sunnyvale, CA (US)

(72) Inventors: David S. Stephenson, San Jose, CA (US); Rajesh Kaliaperumal, Cupertino, CA (US); Ron Sidi, San Jose, CA (US)

(73) Assignee: Arris Enterprises, LLC, Suwanee, GA (US)

( * ) Notice: Subject to any disclaimer, the term of this patent is extended or adjusted under 35 U.S.C. 154(b) by 346 days.

(21) Appl. No.: 15/453,092

(22) Filed: Mar. 8, 2017

(65) Prior Publication Data

US 2017/0265073 A1    Sep. 14, 2017

Related U.S. Application Data

(60) Provisional application No. 62/306,014, filed on Mar. 9, 2016.

(51) Int. Cl.
*H04W 12/06* (2009.01)
*H04L 29/06* (2006.01)
(Continued)

(52) U.S. Cl.
CPC .......... *H04W 12/06* (2013.01); *H04L 63/10* (2013.01); *H04W 12/0804* (2019.01); *H04W 48/14* (2013.01); *H04L 63/0815* (2013.01); *H04L 63/0853* (2013.01); *H04W 4/80* (2018.02); *H04W 12/00514* (2019.01); *H04W 84/12* (2013.01)

(58) Field of Classification Search
CPC ............ H04W 12/06; H04W 12/0804; H04W 12/00514; H04W 48/14; H04W 4/80; H04W 84/12; H04L 63/10; H04L 63/0853; H04L 63/0815
See application file for complete search history.

(56) References Cited

U.S. PATENT DOCUMENTS

| 9,485,235 B2 * | 11/2016 | Zhang ................. H04W 12/08 |
| 2010/0135206 A1 * | 6/2010 | Cherian ............ H04W 36/0066 370/328 |

(Continued)

*Primary Examiner* — Nelson S. Giddins
(74) *Attorney, Agent, or Firm* — Steven Stupp

(57) ABSTRACT

In order to facilitate access to multiple networks, an electronic device may first authorize a portable electronic device to access a radio-access network associated with a network operator. In particular, the electronic device may provide a request with a first identifier for a portable electronic device to an authentication/authorization server for access to the radio-access network. After receiving first authorization information from the authentication/authorization server for the portable electronic device to access the radio-access network, the electronic device may provide a second request with a second identifier of the portable electronic device to a second server for access to a second network associated with the second server and an entity. Based on the subsequent response from the second server, the electronic device may provide access information to a radio node that allows the portable electronic device to access the radio-access network, or radio-access network and the second network.

20 Claims, 4 Drawing Sheets

(51) Int. Cl.
*H04W 48/14* (2009.01)
*H04W 12/08* (2009.01)
H04W 84/12 (2009.01)
H04W 4/80 (2018.01)
H04W 12/00 (2009.01)

(56) References Cited

U.S. PATENT DOCUMENTS

| | | | | |
|---|---|---|---|---|
| 2014/0003337 A1* | 1/2014 | Majmundar | ......... | H04W 48/06 370/328 |
| 2014/0086143 A1* | 3/2014 | Foti | ......... | H04W 4/70 370/328 |
| 2014/0349579 A1* | 11/2014 | Zhou | ......... | H04W 12/06 455/41.2 |
| 2015/0106900 A1* | 4/2015 | Pinski | ......... | H04L 63/0876 726/7 |
| 2015/0148024 A1* | 5/2015 | Jiao | ......... | H04W 76/00 455/418 |
| 2015/0156336 A1* | 6/2015 | Tamura | ......... | H04W 48/18 455/406 |
| 2015/0326512 A1* | 11/2015 | Chiu | ......... | H04L 67/2814 726/7 |
| 2016/0127891 A1* | 5/2016 | Nylander | ......... | H04W 8/26 370/329 |
| 2017/0085568 A1* | 3/2017 | Rolfe | ......... | H04L 63/0861 |
| 2018/0206117 A1* | 7/2018 | Stahl | ......... | H04W 12/04031 |
| 2018/0227752 A1* | 8/2018 | Teyeb | ......... | H04W 12/04 |
| 2019/0029000 A1* | 1/2019 | Vikberg | ......... | H04W 68/00 |

* cited by examiner

CONCATENATED AUTHENTICATION AND AUTHORIZATION TO MULTIPLE NETWORKS

CROSS REFERENCE TO RELATED APPLICATIONS

This application claims priority under 35 U.S.C. 119(e) to U.S. Provisional Application Ser. No. 62/306,014, "Concatenated Authentication and Authorization to Multiple Networks," by David S. Stephenson, Rajesh Kaliaperumal, and Ron Sidi, filed on Mar. 9, 2016, the contents of which are herein incorporated by reference.

BACKGROUND

Field

The described embodiments relate to techniques for communicating information among electronic devices. In particular, the described embodiments relate to techniques for authenticating and authorizing a portable electronic device to access a network associated with a network operator and an enterprise-hosted network (EHN).

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

While many electronic devices communicate with each other via large networks owned by a network operator, small-scale networks associated with entities (such as a company or an organization) are increasingly common. In principle, a user of an electronic device, such as an employee of a company, may wish to use a large network and a small-scale network. In order to do so, the user, via their electronic device, typically performs an authentication procedure (to confirm that the user is who they claim to be) and an authorization procedure (to confirm that the user is authorized to access a given network).

However, the information used to perform the authentication procedures and the authorization procedures in the large network (such as a subscriber identity module or SIM triplet provided by the electronic device) and the small-scale network (such as list of employees) are often different. Moreover, the network operator and the company usually do not want to share such information with each other.

Consequently, the user typically needs to independently perform the authentication procedures and the authorization procedures in the large network and the small-scale network. The independent authentication procedures and the authorization procedures are time-consuming and cumbersome, and can degrade the user experience.

SUMMARY

The described embodiments relate to an electronic device that authenticates and authorizes a portable electronic device associated with a user to multiple networks. This electronic device includes an interface circuit that, during operation, receives, from a radio node (such as an eNode-B or eNB), a first identifier for the portable electronic device, which is associated with the user. In response, the interface circuit provides a request with the first identifier to an authentication/authorization server for access to a radio-access network associated with a network operator. Subsequently, the interface circuit receives a response from the authentication/authorization server with first authorization information that indicates that the portable electronic device is allowed to access the radio-access network. Next, the electronic device holds the first authorization information while the interface circuit provides a second request with a second identifier (which may be the same as the first identifier or different than the first identifier) of the portable electronic device to a second server for access to a second network associated with the second server and an entity (such as a company or an organization, which may be different than the network operator).

Then, the interface circuit receives a second response from the second server with second authorization information. If the second authorization information indicates that the user is allowed to access the second network associated with the entity (such as an enterprise-hosted network), the electronic device provides, via the interface circuit, access information to the radio node that allows the portable electronic device to access the radio-access network, the second network or both. Alternatively, if the second authorization information indicates that the user is only allowed to access the radio-access network (i.e., that the user is not allowed to access the second network), the electronic device provides, via the interface circuit, second access information to the radio node that allows the portable electronic device to access the radio-access network.

Moreover, the authentication/authorization server may include a home subscriber server and the network operator may include a mobile network operator.

Note that the first identifier and/or the second identifier may include an International Mobile Subscriber Identity or IMSI of the portable electronic device, a Mobile Subscriber International Subscriber Directory Number (MS-ISDN) of the user of the portable electronic device and/or information specifying the user of the portable electronic device (which may be maintained by the second network).

Additionally, the electronic device may implement or may provide a mobility management entity (MME) in an evolved packet core (EPC).

In some embodiments, the second network includes a small cell that communicates information using Long Term Evolution. For example, the second network may include an intranet associated with the entity. Note that the radio-access network may include a cellular-telephone network (and, more generally, a wired and/or wireless network provided by the network operator). Thus, the communication technique may allow the user of the portable electronic device to access the Internet (via the cellular-telephone network), an intranet of the entity or both when the portable electronic device is located in a venue associated with the entity and is communication range of the radio node.

Moreover, the electronic device may include: a processor; and a memory, coupled to the processor, which stores a program module that, during operation, is executed by the processor. The program module may include instructions for at least some of the operations performed by the electronic device.

Another embodiment provides a computer-program product for use with the electronic device. This computer-program product includes instructions for at least some of the operations performed by the electronic device.

Another embodiment provides a method. This method includes at least some of the operations performed by the electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
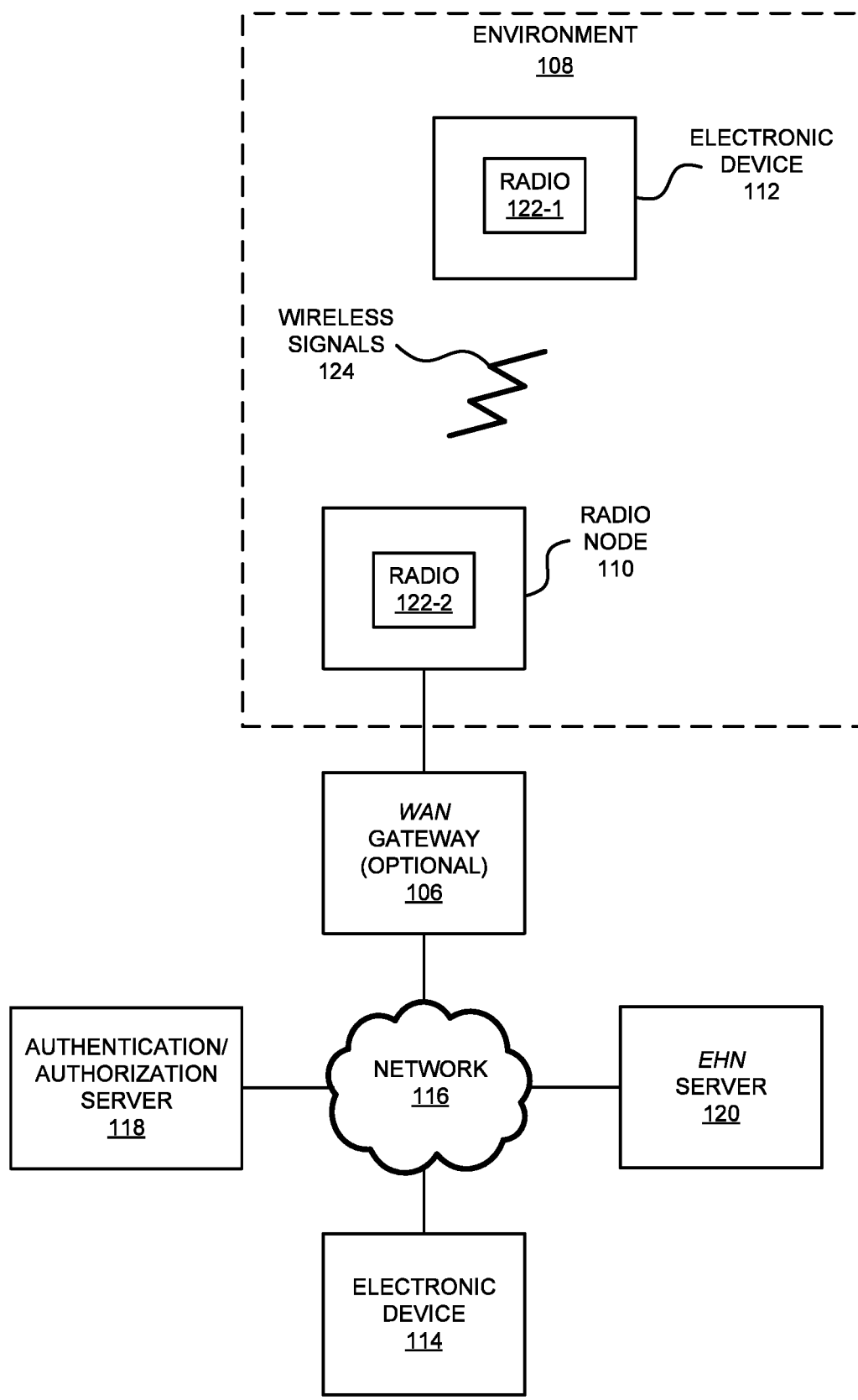
FIG. 1 is a block diagram illustrating electronic devices wirelessly communicating in accordance with an embodiment of the present disclosure.

In order to facilitate access to multiple networks, an electronic device (such as a mobile management system) may first authorize a portable electronic device to access a radio-access network associated with a network operator. In particular, when a user of the portable electronic device (i.e., a subscriber to a radio-access network) enters a venue having a second network (such as a small-scale network), the portable electronic device may provide a first identifier associated with or for the portable electronic device to the electronic device via a radio node in the venue. In response, the electronic device may provide a request with the first identifier to an authentication/authorization server for access to the radio-access network.

After receiving first authorization information from the authentication/authorization server for the portable electronic device to access the radio-access network, the electronic device may provide a second request with a second identifier of the portable electronic device (which may be the same as or different from the first identifier) to a second server for access to the second network associated with the second server and an entity. Based on the subsequent response from the second server, the electronic device may provide access information to the radio node that allows the portable electronic device to access the radio-access network, or radio-access network and the second network.

This communication technique may allow the portable electronic device to be securely and dynamically allowed to access the radio-access network, or the radio-access network and the second network. For example, the radio-access network may include a cellular-telephone network, and the second network may include an intranet associated with the second server and the entity. Thus, the communication technique may allow the user of the portable electronic device to be able to selectively access the Internet (via the cellular-telephone network), an intranet of the entity or both when the portable electronic device is located in the venue associated with the entity and when the portable electronic device is communication range of the radio node.

Consequently, the communication technique may allow the user, via their portable electronic device, to seamlessly perform authentication and get authorized to radio-access network and the second network. In particular, from the perspective of the portable electronic device (and, thus, the user), the authentication and authorization appears to occur concurrently because the first identifier is communicated to the electronic device and then the access information is received. (In fact, as described above, via the electronic device the authentication and authorization to the radio-access network and the second network is sequential.) Thus, the communication technique may reduce the time and effort needed for the user to authenticate and authorize access to the radio-access network and/or the second network, which may improve the user experience when using the portable electronic device.

In the discussion that follows, the portable electronic device may include a radio that communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Long Term Evolution (LTE) is used as an illustrative example. However, a wide variety of communication protocols (such as Wi-Fi, cellular or others) may be used.

A cellular-telephone network may include base stations (and associated cell towers) that implement so-called 'macro cells.' These macro cells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce cross-talk or interference between the signals transmitted by different cell towers and/or different macro cells.

However, there are often gaps in the coverage offered by macro cells. In particular, gaps in radio coverage can occur in the interior of a building because the transmission in a macro cell may not be powerful enough to penetrate the building. Consequently, some users operate local transceivers that provide short-range communication in the cellular-telephone network. These so-called 'femto cells' provide short-range communication (e.g., up to 10 m) for a few individuals.

In addition, larger entities or organizations (such as those with 50-60 users) may operate local transceivers that provide communication in the cellular-telephone network over a range of 100 m. This intermediate-range coverage in the cellular-telephone network is typically referred to as a 'small cell.'

Recently, entities have established or hosted small cells based on a data communication protocol, such as LTE. (However, as noted previously, a wide variety of communication techniques or protocols may be used to implement a small cell, such as those used in cellular systems or communicate with a radio access network and are not limited to LTE.) These small cells are examples of enterprise-hosted networks or EHNs (which are sometimes referred to as 'neutral-host networks), i.e., networks that are hosted by entities other than a network operator (such as a cellular-telephone carrier).

In principle, a small cell that implements an LTE network can allow an entity (such as a company or an enterprise) to provide a wide variety of services. However, one challenge is how to onboard electronic devices to such a small-cell LTE network. For example, if a company (or an organization) hosts a small-cell LTE network, it can be challenging for the company to authenticate and authorize an employee's personal electronic device (such as their cellular telephone and, more generally, their portable electronic device) so that they can access and use this network. In particular, typically in LTE a user buys an electronic device with a subscriber identification module or SIM (or the user buys the SIM at some other point of sale). This SIM allows the users to connect to the LTE network. In contrast, in an EHN, the local venue usually is not setup to issue its own SIMS, but may be interested to provide a way to onboard devices in more of a self-service manner (such as Bring Your Own Device).

To address this problem, the communication technique allows an individual's portable electronic device to be authenticated and authorized to access a small-cell LTE network associated with the entity (such as company or an organization) after the individual's portable electronic device has been authenticated and authorized to a cellular-telephone network.

We now further describe communication among electronic devices, including the portable electronic device. FIG. 1 presents a block diagram illustrating a radio node 110 (such as a transceiver or an electronic device that is associated with a small cell that communicates using LTE, e.g., it may provide at least some of the functionality of an eNode-B, in small-cell LTE network associated with or provided by an entity) and an electronic device 112 (such as a portable electronic device, e.g., a cellular telephone or a smartphone) wirelessly communicating in an environment 108 (such as in or at a venue or a building associated with the entity) according to some embodiments. In particular, radio node 110 and electronic device 112 may wirelessly communicate while: transmitting advertising frames on wireless channels, detecting one another by scanning wireless channels, establishing connections (for example, by transmitting association or attach requests), and/or transmitting and receiving packets (which may include the association requests and/or additional information as payloads).

Radio node 110 may communicate with electronic device 114 via network 116. In particular, network 116 may include the Internet, and radio node may access network 116 via a local area network and an optional wide-area-network (WAN) gateway 106. Thus, in general, communication between radio node 110 and electronic device 114 may involve a wired communication protocol, such as Ethernet. As described further below, electronic device 114 may implement or provide a mobility management entity (MME) in an evolved packet core (EPC).

Furthermore, radio node 110 may communicate via network 116 with an authentication/authorization server 118 associated with a network operator. For example, the network operator may be a mobile network operator, and authentication/authorization server 118 may be a home subscriber server. Therefore, authentication/authorization server 118 may authorize access to a cellular-telephone network associated with or provided by the network operator.

Additionally, electronic device 110 may communicate via network 116 with EHN server 120, which may include information that is used to authenticate and authorize access to the small-cell LTE network (and, more generally, a second network) associated with the entity. For example, EHN server 120 may implement or use Active Directory (from Microsoft Corp. of Redmond, Wash.). Alternatively or additionally, EHN server 120 may implement or use a lightweight directory access protocol (LDAP) and/or a simple object access protocol (SOAP) to access a user database.

Figure 4:
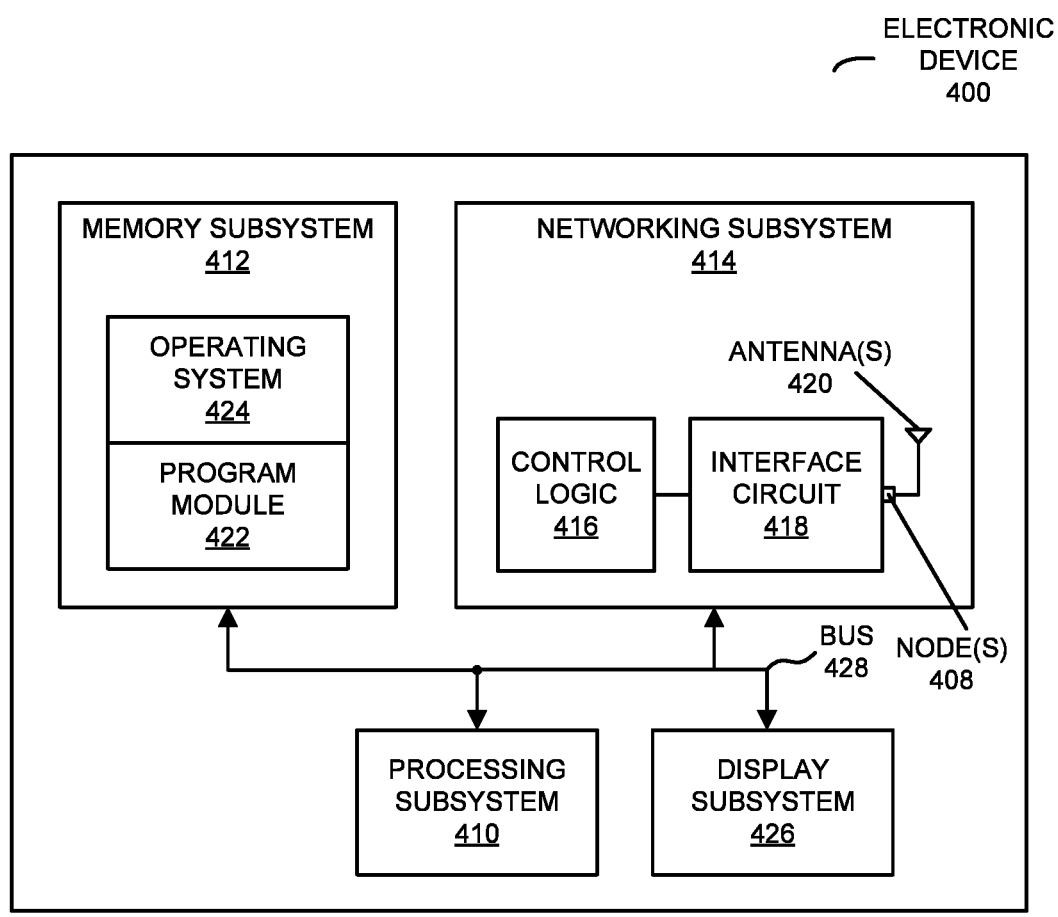
FIG. 4 is a block diagram illustrating an electronic device in accordance with an embodiment of the present disclosure.

As described further below with reference to FIG. 4, radio node 110, electronic device 112, electronic device 114, authentication/authorization server 118 and/or EHN server 120 may include subsystems, such as a networking subsystem, a memory subsystem and a processor subsystem. In addition, radio node 110 and electronic device 112 may include radios 122 in the networking subsystems. More generally, radio node 110 and electronic device 112 can include (or can be included within) any electronic devices with the networking subsystems that enable radio node 110 and electronic device 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 122 are shown in radio node 110 and electronic device 112, one or more of these instances may be different from the other instances of radios 122.

As can be seen in FIG. 1, wireless signals 124 (represented by a jagged line) are transmitted from radio 122-1 in electronic device 112. These wireless signals may be received by radio 122-2 in radio node 110. In particular, electronic device 112 may transmit packets. In turn, these packets may be received by radio node 110. Moreover, radio node 110 may allow electronic device 112 to communicate with other electronic devices, computers and/or servers (such as electronic device 114, authentication/authorization server 118 and/or EHN server 120) via network 116 (such as the cellular-telephone network and/or the small-cell LTE network).

Note that the communication between radio node 110 and electronic device 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Figure 2:
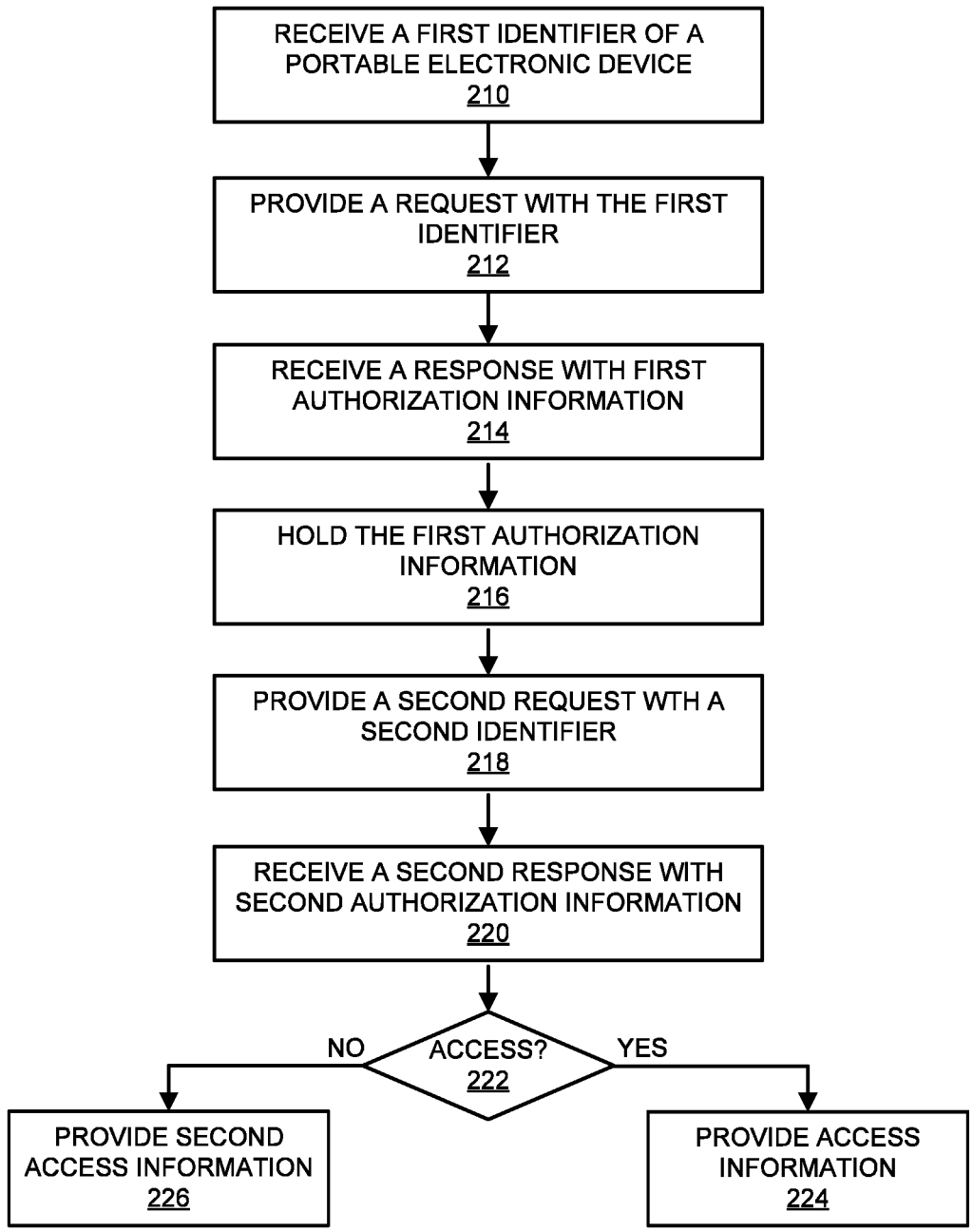
FIG. 2 is a flow diagram illustrating a method for authenticating and authorizing a user in multiple networks in accordance with an embodiment of the present disclosure.

As discussed further below with reference to FIGS. 2 and 3, in the communication technique, a user of electronic device 112 is authenticated and authorized to multiple networks. In particular, when electronic device 112 first communicates with radio node 110, a physical or an electronic SIM card in electronic device 112 may authenticate electronic device 112.

Then, via radio node 110 and network 116, electronic device 112 may communicate the first identifier to electronic device 114. For example, electronic device 112 may communicate an International Mobile Subscriber Identity or IMSI of electronic device 112 to electronic device 114. More generally, electronic device 112 may communicate a global and unique identifier of electronic device 112, a Mobile Subscriber International Subscriber Directory Number (MS-ISDN) of the user of electronic device 112 and/or information specifying the user of electronic device 112 (which may be maintained by the small-cell LTE network).

After receiving the first identifier, electronic device 114 may provide, via network 116, a request with the first identifier to authentication/authorization server 118. Authentication/authorization server 118 may authorize electronic device 112 based on the first identifier. Moreover, authentication/authorization server 118 may authorize the user of electronic device 112 to access the cellular-telephone network associated with the network operator (and, more generally, a radio-access network).

Moreover, via network 116, authentication/authorization server 118 may provide a response to electronic device 114 with first authorization information that indicates that electronic device 112 is allowed to access the cellular-telephone network. After receiving the first authorization information, electronic device 114 may hold the first authorization information while electronic device 114 provides, via network 116, a second request with the IMSI (and, more generally, a second identifier, which may be the same as or different from the first identifier) of electronic device 112 to EHN server 120 for access to the small-cell LTE network (and, more generally, a second network associated with EHN server 120 and the entity). For example, electronic device 114 may provide a remote authentication dial-in user service (RADIUS) and, after receiving the response, electronic device 114 may hold the RADIUS response.

In response to the second request, EHN server 120 may authenticate electronic device 112 and may authorize the user to access the small-cell LTE network. For example, the entity may include a company or an organization, and the user may be associated with the entity (such as an employee of the company). Moreover, EHN server 120 may store a data structure in memory with a list of employees of the company and the IMSIs of their portable electronic devices. This information in the data structure may be predefined, e.g., by a system administrator of the entity. Alternatively or additionally, an application installed on and executing on electronic device 112 may provide the IMSI of electronic device 112 to EHN server 120. For example, the user may install the application on electronic device 112 when they start working for the entity and, by providing appropriate credentials from the entity (such as a username and password), the application may provide the IMSI of electronic device 112 to EHN server 120 for inclusion in the data structure. In some embodiments, the user may also register with EHN server 120 using a browser and the appropriate credentials.

Subsequently, when the second request is received, EHN server 120 may look-up the user in the data structure based on the IMSI to confirm that the user is associated with or is an employee of the entity. Note that the communication technique may rely on the more-secure authentication performed by electronic device 112 and the more-secure authorization performed by authentication/authorization server 118 to provide additional security. Thus, if the first authorization information does not grant the user access to the cellular-telephone network, electronic device 114 may not provide the second request to EHN server 120, and electronic device 112 (and, thus, the user) may not be allowed to access the cellular-telephone network or the small-cell LTE network.

Next, via network 116, EHN server 120 may provide a second response to electronic device 114 with second authorization information. If the second authorization information indicates that the user is allowed to access the small-cell LTE network, electronic device 114 may provide, via network 116 and radio node 110, access information to electronic device 112 that allows electronic device 112 to access the cellular-telephone network, the small-cell LTE network or both via radio node 110. For example, the access information may include an attribute value pair associated with a virtual local area network (VLAN) that allows access to the cellular-telephone network, the small-cell LTE network or both. Thus, in these embodiments, the small-cell LTE network may allow the user to access an intranet associated with the entity and/or the Internet via the cellular-telephone network by bridging frames on a wired LAN on to the VLAN.

Alternatively, if the second authorization information indicates that the user is only allowed to access the cellular-telephone network (i.e., that the user is not allowed to access the small-cell LTE network associated with the entity), electronic device 114 may provide, via network 116 and radio node 110, second access information to electronic device 112 that allows electronic device 112 only to access the cellular-telephone network via radio node 110. For example, the second access information may include a second attribute value pair associated with a second VLAN that allows access to the cellular-telephone network. Thus, in these embodiments, the user may use the cellular-telephone network to access the Internet by bridging frames on a wired LAN on to the second VLAN.

In the described embodiments, processing a packet or frame in radio node 110 and/or electronic devices 112 includes: receiving wireless signals 124 with the packet or frame; decoding/extracting the packet or frame from received wireless signals 124 to acquire the packet or frame; and processing the packet or frame to determine information contained in the packet or frame (such as the access information for the small-cell LTE network).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the method. FIG. 2 is a flow diagram illustrating a method 200 for authenticating and authorizing a user in multiple networks, which may be performed by an electronic device (such as electronic devices 114 in FIG. 1). During operation, an interface circuit in the electronic device receives, from a radio node, a first identifier (operation 210) for the portable electronic device, which is associated with the user. In response, the interface circuit provides a request with the first identifier (operation 212) to an authentication/authorization server for access to a radio-access network associated with a network operator.

Subsequently, the interface circuit receives, from the authentication/authorization server, a response with first authorization information (operation 214) that indicates that the portable electronic device is allowed to access the radio-access network. Next, the electronic device holds the first authorization information (operation 216) while the interface circuit provides a second request with a second identifier (operation 218) of the portable electronic device to a second server for access to a second network associated with the second server and an entity. Then, the interface circuit receives, from the second server, a second response with second authorization information (operation 220).

If the second authorization information indicates that the user is allowed to access (operation 222) the second network, the electronic device provides, via the interface circuit, access information (operation 224) to the radio node that allows the portable electronic device to access the radio-access network, the second network or both. Alternatively, if the second authorization information indicates that the user is not allowed to access (operation 222) the second network, the electronic device provides, via the interface circuit, second access information (operation 226) to the radio node that allows the portable electronic device to access the radio-access network.

In some embodiments of method 200, there may be additional or fewer operations. Furthermore, the order of the operations may be changed, and/or two or more operations may be combined into a single operation.

Figure 3:
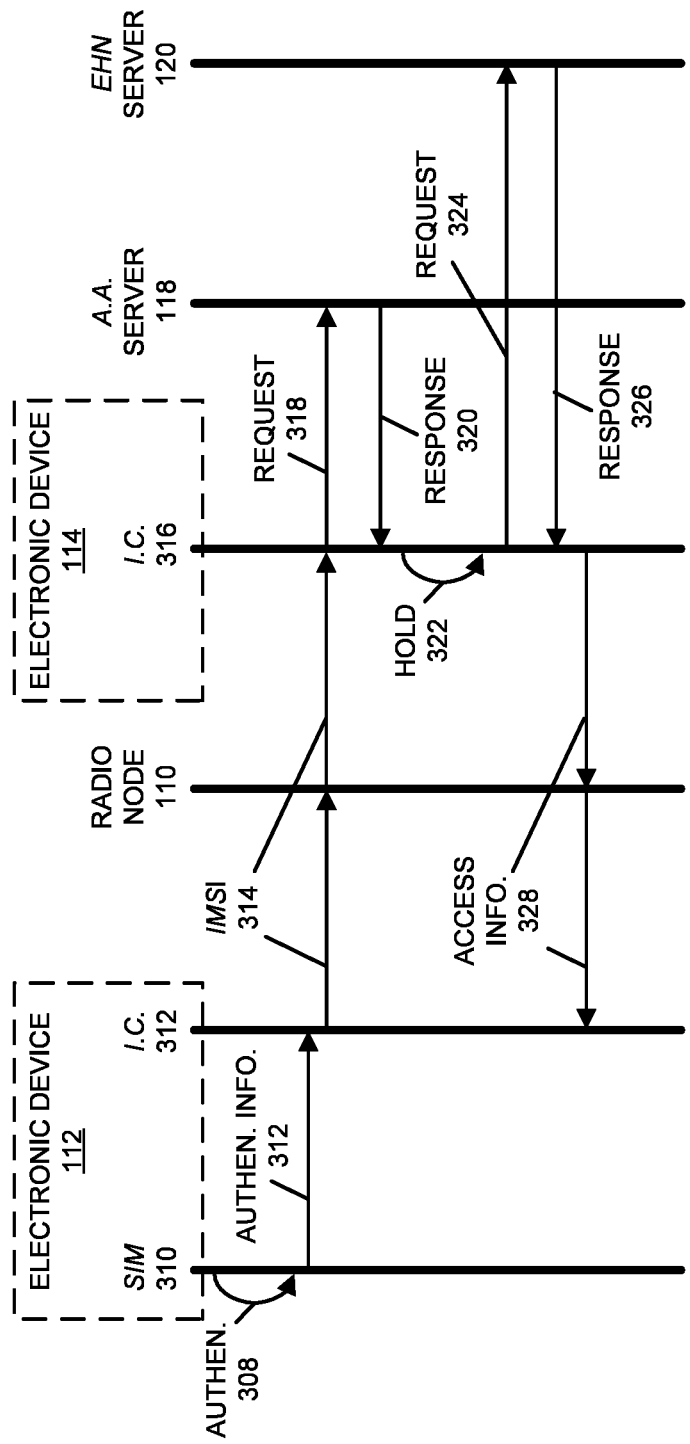
FIG. 3 is a drawing illustrating communication among the electronic devices in FIG. 1 in accordance with an embodiment of the present disclosure.

Embodiments of the communication technique are further illustrated in FIG. 3, which presents a drawing illustrating communication among radio node 110 and electronic device 112, electronic device 114, authentication/authorization server 118 and EHN server 120 according to some embodiments. In particular, SIM 310 in electronic device 112 may authenticate electronic device 112 and may provide authentication information 312. (In some embodiments, however, electronic device 112 does not include a physical or a virtual SIM.) Then, interface circuit (I.C.) 312 in electronic device 112 may provide the first identifier (such as IMSI 314) to radio node 110, which provides this information to electronic device 114.

After receiving IMSI 314, interface circuit (I.C.) 316 in electronic device 114 may provide a request 318 with IMSI 314 to authentication/authorization (A.A.) server 118. After authenticating and authorizing the user's access to the cellular-telephone network, authentication/authorization server 118 may provide response 320 with first authorization information that indicates that electronic device 112 is allowed to access the cellular-telephone network (and, more generally, the Internet).

Next, electronic device 114 (such as processor executing software or a program module) may hold 322 the first authorization information while interface circuit 316 may provide a request 324 with IMSI 314 to EHN server 120 for access to the small-cell LTE network associated with an entity. After authenticating and authorizing the user's access to the small-cell LTE network, EHN server 120 may provide response 326 with second authorization information that indicates whether electronic device 112 is allowed to access the small-cell LTE network (and, more generally, an intranet of the entity).

Furthermore, electronic device 114 may provide access information 328 to electronic device 112 via radio node 110 based on the first authorization information and the second authorization information. In particular, if the second authorization information indicates that the user is allowed to access the small-cell LTE network, access information 328 may allow electronic device 112 to access the cellular-telephone network, the small-cell LTE network or both via radio node 110. Alternatively, if the second authorization information indicates that the user is not allowed to access the small-cell LTE network, access information 328 may allow electronic device 112 to access the cellular-telephone network via radio node 110.

While the preceding discussion used cellular or mobile telephones as an illustration, the communication technique may be applied or used with a wide variety of electronic devices and communication protocols. For example, by pairing the LTE evolved packet core and IMS with hotspot 2.0 and credential or certificate-based onboarding of non-SIM-based devices, these services may be extended to Wi-Fi only devices (such as tablets and laptops). More generally, the communication technique may be used in the context of Wi-Fi.

We now describe embodiments of an electronic device, which may perform at least some of the operations in the communication technique. For example, the electronic device may include an electronic device that performs the operations in FIG. 1 or a transceiver or a server associated with a small cell (which may perform counterparts to the operations in FIG. 2). FIG. 4 presents a block diagram illustrating an electronic device 400 in accordance with some embodiments. This electronic device includes processing subsystem 410, memory subsystem 412, and networking subsystem 414. Processing subsystem 410 includes one or more devices configured to perform computational operations. For example, processing subsystem 410 can include one or more microprocessors, ASICs, microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program module 422 or operating system 424), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420 (or antenna elements). (While FIG. 4 includes one or more antennas 420, in some embodiments electronic device 400 includes one or more nodes, such as nodes 408, e.g., a pad, which can be coupled to the one or more antennas 420. Thus, electronic device 400 may or may not include the one or more antennas 420.) For example, networking subsystem 414 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices as described previously.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments program module 422 is included in operating system 424 and/or control logic 416 is included in interface circuit 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 414. The integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an LTE communication protocol as an illustrative example, in other embodiments a wide variety of cellular-telephone communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 422, operating system 424 (such as a driver for interface circuit 418) or in firmware in interface circuit 418. Alternatively or additionally, at least some of the operations in the communication technique may be implemented in a physical layer, such as hardware in interface circuit 418.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with a radio node, a portable electronic device, an authentication/authorization server and a second server, wherein the electronic device is configured to:
receive, via the interface circuit, a first identifier associated with a radio node for the portable electronic device, which is associated with a user;
provide, via the interface circuit, a request intended for the authentication/authorization server with the first identifier to request access to a radio-access network associated with a network operator;
receive, via the interface circuit, a response associated with the authentication/authorization server with first authorization information that indicates that the portable electronic device is allowed to access the radio-access network;
hold the first authorization information;
provide, via the interface circuit, a second request intended for the second server with a second identifier of the portable electronic device to request access to a second network associated with the second server and an entity;
receives, via the interface circuit, a second response associated with the second server with second authorization information, wherein the second request is provided after the response is received so that the first authorization information provides enhanced security to the second authorization information; and
provides, via the interface circuit, access information intended for the radio node and based on the second authorization information that allows the portable electronic device to access one of: the radio-access network, or the radio-access network and the second network.

2. The electronic device of claim 1, wherein, when the second authorization information indicates that the user is allowed to access the second network, the access information allows the portable electronic device to access the radio-access network and the second network.

3. The electronic device of claim 1, wherein, when the second authorization information indicates that the user is not allowed to access the second network, the access information allows the portable electronic device to access the radio-access network.

4. The electronic device of claim 1, wherein the first identifier comprises one of: an International Mobile Subscriber Identity (IMSI) of the portable electronic device, a Mobile Subscriber International Subscriber Directory Number (MS-ISDN) of the user of the portable electronic device, or information specifying the user of the portable electronic device.

5. The electronic device of claim 1, wherein the second identifier is different than the first identifier.

6. The electronic device of claim 1, wherein the authentication/authorization server comprises a home subscriber server and the network operator comprises a mobile network operator.

7. The electronic device of claim 1, wherein the electronic device provides a mobility management entity (WE) in an evolved packet core (EPC).

8. The electronic device of claim 1, wherein the electronic device further comprises:
a processor; and
a memory, coupled to the processor, which stores program instructions, wherein, when executed by the processor, the program instructions cause the electronic device to perform at least some of the operations performed by the electronic device.

9. A non-transitory computer-readable storage medium for use in conjunction with an electronic device, the computer-readable storage medium storing program instructions to authenticate and authorize a user in multiple networks, wherein, when executed by the electronic device, the program instructions cause the electronic device to perform operations comprising:
receiving, via an interface circuit in the electronic device, a first identifier associated with a radio node for a portable electronic device, which is associated with a user;
providing, via the interface circuit, a request intended for an authentication/authorization server with the first identifier for to request access to a radio-access network associated with a network operator;
receiving, via the interface circuit, a response associated with the authentication/authorization server with first authorization information that indicates that the portable electronic device is allowed to access the radio-access network;
holding the first authorization information;
providing, via the interface circuit, a second request intended for a second server with a second identifier of the portable electronic device to request access to a second network associated with the second server an entity;
receiving from the second server, via the interface circuit, a second response associated with the second server with second authorization information, wherein the second request is provided after the response is received so that the first authorization information provides enhanced security to the second authorization information; and providing, via the interface circuit, access information intended for the radio node based on the second authorization information that allows the portable electronic device to access using the radio node one of: the radio-access network, or the radio-access network and the second network.

10. The computer-readable storage medium of claim 9, wherein, when the second authorization information indicates that the user is allowed to access the second network, the access information allows the portable electronic device to access the radio-access network and the second network.

11. The computer-readable storage medium of claim 9, wherein, when the second authorization information indicates that the user is not allowed to access the second network, the access information allows the portable electronic device to access the radio-access network.

12. The computer-readable storage medium of claim 9, wherein the first identifier comprises one of: an International Mobile Subscriber Identity (IMSI) of the portable electronic device, a Mobile Subscriber International Subscriber Directory Number (MS-ISDN) of the user of the portable electronic device, or information specifying the user of the portable electronic device.

13. The computer-readable storage medium of claim 9, wherein the second identifier is different from the first identifier.

14. The computer-readable storage medium of claim 9, wherein the authentication/authorization server comprises a home subscriber server and the network operator comprises a mobile network operator.

15. The computer-readable storage medium of claim 9, wherein the electronic device provides a mobility management entity (WE) in an evolved packet core (EPC).

16. A method for authenticating and authorizing a user in multiple networks, wherein the method comprises:
by an electronic device:
receiving, via an interface circuit in the electronic device, a first identifier associated with a radio node for a portable electronic device, which is associated with a user;
providing, via the interface circuit, a request intended for an authentication/authorization server with the first identifier for to request access to a radio-access network associated with a network operator;
receiving, via the interface circuit, a response associated with the authentication/authorization server with first authorization information that indicates that the portable electronic device is allowed to access the radio-access network;
holding the first authorization information;
providing, via the interface circuit, a second request intended for a second server with a second identifier of the portable electronic device to request access to a second network associated with an entity;
receiving, via the interface circuit, a second response associated with the second server with second authorization information, wherein the second request is provided after the response is received so that the first authorization information provides enhanced security to the second authorization information; and
providing, via the interface circuit, access information intended for the radio node based on the second authorization information that allows the portable electronic device to access using the radio node one of: the radio-access network, or the radio-access network and the second network.

17. The method of claim 16, wherein, when the second authorization information indicates that the user is allowed to access the second network, the access information allows the portable electronic device to access the radio-access network and the second network.

18. The method of claim 16, wherein, when the second authorization information indicates that the user is not allowed to access the second network, the access information allows the portable electronic device to access the radio-access network.

19. The method of claim 16, wherein the first identifier comprises one of: an International Mobile Subscriber Identity (IMSI) of the portable electronic device, a Mobile Subscriber International Subscriber Directory Number (MS-ISDN) of the user of the portable electronic device, or information specifying the user of the portable electronic device.

20. The method of claim 16, wherein the second identifier is different than the first identifier.

* * * * *